May 30, 1933.  C. W. COLLINS  1,911,352
BRAKE MECHANISM
Filed April 28, 1930   2 Sheets-Sheet 1
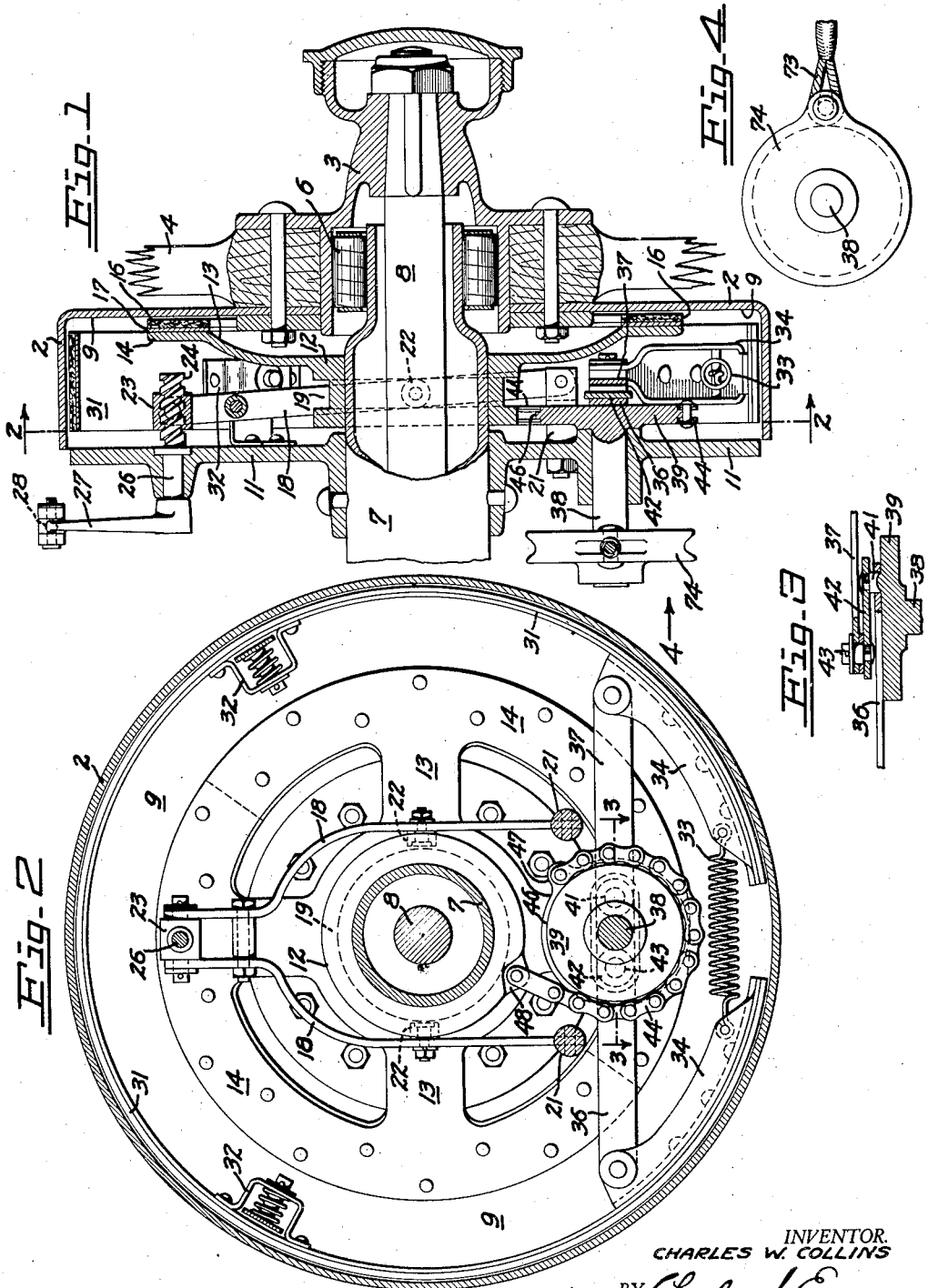
INVENTOR.
CHARLES W. COLLINS
BY Charles A. Evans
HIS ATTORNEY

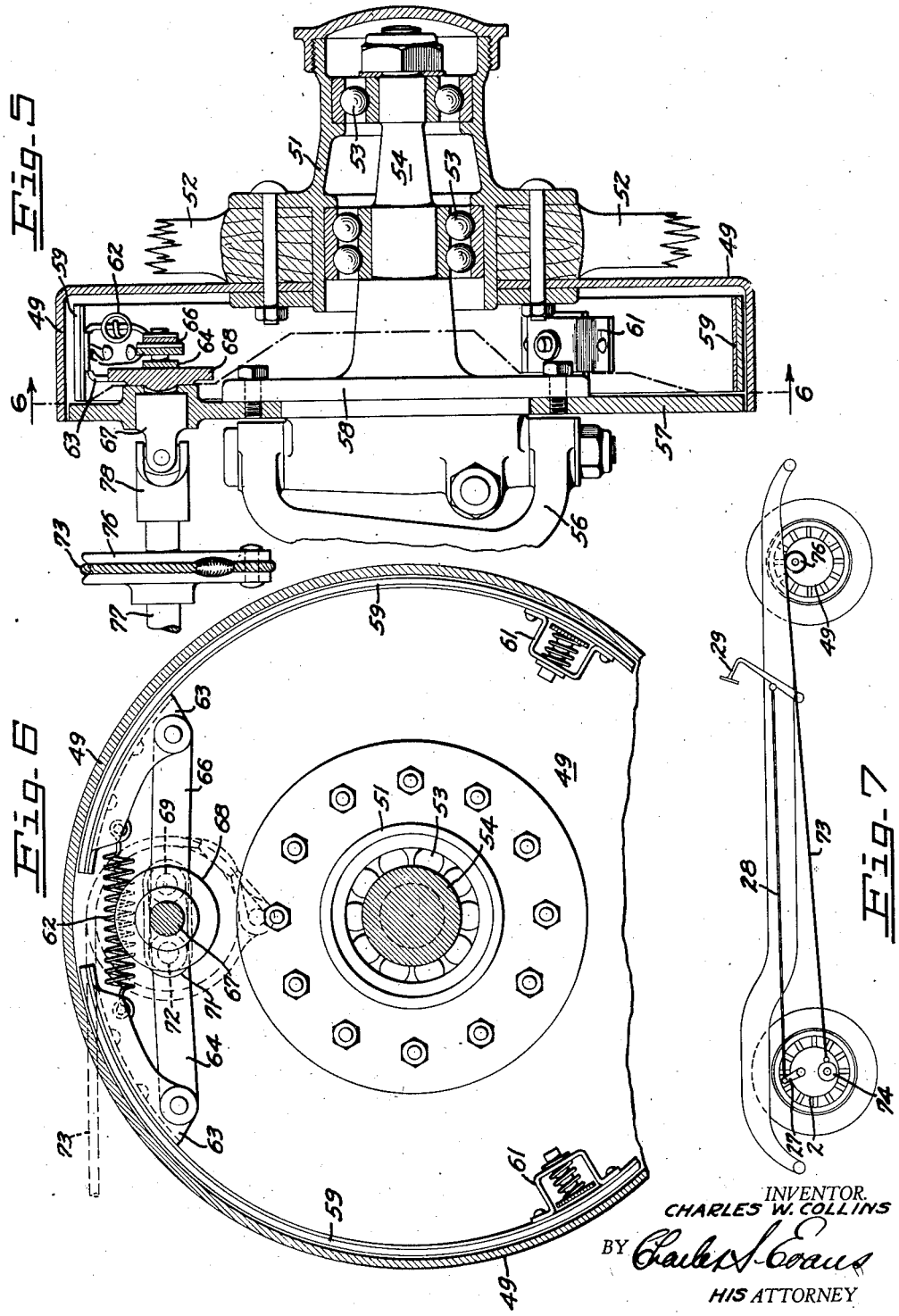

Patented May 30, 1933

1,911,352

UNITED STATES PATENT OFFICE

CHARLES W. COLLINS, OF SEATTLE, WASHINGTON

BRAKE MECHANISM

Application filed April 28, 1930. Serial No. 447,827.

My invention relates to a brake mechanism, and particularly to such a mechanism for motor vehicles.

It is among the objects of my invention to provide a brake mechanism in which a large portion of the retarding or braking force required is derived from the movement to be retarded.

Another object of my invention is to provide a brake mechanism in which the operation of a brake on one wheel is used to actuate a brake on another wheel.

Further objects of my invention include the provision of a brake mechanism whose action is independent of the direction of rotation of the braked wheel; which will not cause skidding or sliding of the wheels; and in which the braking force is proportional to the movement being retarded.

The invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 1 is a transverse vertical sectional view of the brake mechanism embodying my invention showing the rear wheel brake; portions of a vehicle rear wheel and mounting are shown to indicate the operative relationship.

Figure 2 is a transverse vertical sectional view of the rear wheel brake taken in a plane indicated by line 2—2 of Figure 1.

Figure 3 is a fragmentary sectional view of the brake band actuating couple taken in a plane indicated by line 3—3 of Figure 2.

Figure 4 is a side view of the brake control pulley taken in the direction of arrow 4 of Figure 1.

Figure 5 is a transverse vertical sectional view of the brake mechanism embodying my invention showing the front wheel brake; portions of a vehicle front wheel and mounting are shown to indicate the operative relationship.

Figure 6 is a transverse vertical sectional view of the front wheel brake taken in a plane indicated by line 6—6 of Figure 5.

Figure 7 is a longitudinal vertical sectional view of an automobile chassis showing the brake mechanism of my invention mounted on the rear and front wheels of the vehicle.

Broadly stated, the brake mechanism embodying my invention comprises a rotatable drum with which a brake band and an oscillable clutch member are engageable. Means are provided for moving the clutch member into engagement with the brake drum, and means are provided for engaging the brake band and drum upon oscillation of the clutch member; the brake being preferably engaged independently of the direction of oscillation of the clutch member. Means are also preferably provided for engaging a brake band and drum in a brake on one wheel of a vehicle upon the oscillation of the clutch member in a brake on another wheel of the vehicle.

In more detailed terms, the brake mechanism embodying my invention, as applied to an automobile, includes a rear wheel brake comprising a drum 2 secured to the hub 3 of a rear wheel 4. The wheel is shown as being mounted on the roller bearings 6 which run on the axle housing 7 in the usual manner; the drive for the wheel 4 being provided by the live axle 8. The drum differs from the usual brake only in having its disk surface 9 smoothly finished to provide a clutch surface. A disk 11 mounted on the axle housing 7 provides a backing place for the brake drum 2.

Slidably and oscillably mounted on the axle housing 7, within the brake drum 2, is an annular ring 12 carrying a clutch member or disk 13; this disk being dished to clear the wheel hub and drum mounting, and having a peripheral flange 14 faced with a frictional material 16. It is convenient to mount the frictional material upon a thin ring 17 which is divided into two halves to permit ready replacement; the material being of any suitable substance which will provide a frictional surface capable of engaging smoothly and easily and disengaging instantly.

Means are provided for moving the clutch member 13 into engagement with the drum clutch surface 9, and to this end the yoke 18 is provided straddling the annular groove 19 in the clutch member hub ring 12. The yoke 18 is pivotally mounted within the brake drum 2 on the studs 21 secured on the backing plate 11, and is provided with the groove engaging rollers 22. A block 23, pivoted in the free end of yoke 18, is tapped to receive the threaded end 24 of a shaft 26 journaled in the backing plate 11.

The projected end of shaft 26 is provided with a crank 27, which, in turn, is operated by a brake rod 28 connecting to the usual foot pedal 29 of the automobile. By this arrangement, it is apparent that a pressure applied on the foot pedal will rotate the threaded shaft 26, and cause the yoke 18 to move the clutch member 13 into engagement with the drum clutch surface 9.

Means are provided for utilizing the turning movement of the engaged clutch member to operate a brake mounted within the drum 2. A brake band 31 is disposed about the inner circumference of the brake drum, and is resiliently mounted on the backing plate 11 by the bracket supports 32 in the usual manner. The adjacent ends of the brake band are connected by a tension spring 33, and are also provided with the brackets 34 in which are pivoted the connecting links 36 and 37.

A shaft 38, journaled in the backing plate 11, and arranged adjacent the inner ends of the brake band connecting links 36 and 37, is provided with a circular face plate 39. The link 36 is pivoted on a stud 41 fixedly mounted on the face plate 39, and an arm 42, overlaying the link 36 and fixed to the stud 41, carries a stud 43 on which link 37 is pivoted. The studs 41 and 43 are diametrically arranged an equal distance from the axis of the shaft 38, so that a couple is provided which operates to engage the brake band 31 and drum 2 upon rotation of the couple shaft face plate 39. Normal disengagement of the brake band and drum is maintained by the tension spring 33; and in this position the connecting links 36 and 37 are held in a parallel position as shown in Figure 2.

A flexible connecting means 44, which may conveniently be a chain, is disposed about the periphery of the face plate 39 for the greater part of its circumference, and engages the peripheral flange 46 thereof. The chain 44 is pivotally secured at one end to the face plate ear 47, and is similarly secured at the other end to an ear 48 formed on the periphery of the clutch member hub ring 12. In order that the chain 44 operate to rotate the face plate 39 in the same direction regardless of the direction of rotation or oscillation of the clutch member, the chain 44 is secured to the hub ring 12 at a point in a line passing through the hub ring axis and tangent to the face plate circumference. By this construction it is apparent that an oscillation of the clutch member in either direction from the normal will cause a clockwise rotation of the couple; this arrangement being clearly shown in Figure 2.

The brake mechanism embodying my invention also preferably includes a front wheel brake comprising a drum 49 secured to the hub 51 of a front wheel 52. The wheel is shown as being mounted on the ball bearings 53 which run on the stub shaft 54; this shaft being pivotally mounted in the bifurcated end 56 of the front wheel axle in the usual manner. A disk 57, mounted on the flange 58 of the stub shaft 54, provides a backing plate for the brake drum 49.

A brake band 59 is disposed about the inner circumference of the brake drum 49, and is resiliently mounted on the backing plate 57 by the bracket supports 61. The adjacent ends of the brake band are connected by a tension spring 62; and are also provided with the brackets 63, in which are pivoted the connecting links 64 and 66. A shaft 67, journaled in the backing plate 57 and arranged adjacent the inner ends of the brake band connecting links 64 and 66, is provided with circular face plate 68.

The link 64 is pivoted on a stud 69 mounted on the face plate 68; and an arm 71, overlying the link 64 and fixed to the end of stud 69, carries a stud 72 on which the link 66 is pivoted. The studs 64 and 66 are diametrically arranged an equal distance from the axis of the shaft, so that a couple is provided which operates to engage the brake band 59 and drum 49 upon rotation of the shaft 67; this brake band moving means being similar to that described in connection with the rear wheel brake.

Means are provided for actuating the front wheel brake upon operation of the rear wheel brake, and to this end the flexible link or connecting cable 73 is preferably provided. One end of the cable is secured to the periphery of a pulley 74 mounted for rotation on the end of the rear wheel brake couple shaft 38, so that the cable extends radially from the pulley in its normal position; this arrangement being clearly shown in Figures 1 and 4. The other end of the cable 73 is wrapped around and secured to pulley 76 mounted for rotation with the front wheel brake couple shaft 67. The front wheel pulley 76 is secured on a shaft 77 connected to the couple shaft 67 through a universal joint 78 arranged in line with the wheel pivot axis. The other end of the pulley shaft 77 is mounted on the automobile front axle through another similar universal joint; this arrangement of the pulley shaft permitting free movement of the front wheel.

The clutch member 13 in the rear wheel brake always operates to rotate the face plate 39, and consequently the pulley 74, in the same direction; and since the cable 73 normally extends radially from the pulley 74, a tension is always applied to the cable upon engagement of the clutch. This tension causes the front wheel pulley 76 to rotate and operate the front wheel brake actuating couple to engage the brake band 59 and drum 49; and, whether the vehicle be moving forward or backward the brake mechanism may always be operated to engage the brakes. Furthermore, the particular arrangement of cable 73 on the pulleys 74 and 76 causes pulley 76 to rotate more slowly at the beginning than pulley 74. Thus it is seen, that, though the brakes are substantially simultaneous in their action, the rear brake will reach its full braking power slightly before the front brake. This provides a smooth braking action for the retardation of the vehicle; and the braking ratio may be adjusted by varying the position of cable 73 on the periphery of pulley 74.

The brake mechanism has been described in connection with one front wheel and its following rear wheel; it being sufficient to say that the other two wheels are equipped in the same manner. The foot pedal connecting rod 28 is preferably connected to both rear wheel brakes, so that the clutch member 13 of each rear wheel brake is moved into engagement with the brake drums simultaneously.

*Operation.*—When it is desired to slow down or stop an automobile equipped with the brake mechanism of my invention, a pressure is applied to the foot pedal 29. This action engages the clutches in the rear wheel brakes, and causes the clutch member 13 to oscillate, or tend to rotate in the direction of the wheel rotation. As a result, the brake band actuating couple is rotated, and the ends of the brake band 31 are spread to effect engagement of the band and drum 2.

Since the brake band actuating couples in the rear wheel brakes are connected for rotation with the brake band actuating couples in the front wheels, the brake bands in the front wheel brakes will be actuated simultaneously with those in the rear wheel brakes. In other words, the oscillatory movement of the clutch members in the rear wheel brakes is utilized to engage the brake bands and drums in both the rear and front wheel brakes. This construction affords a simple and efficient brake mechanism which operates on all four wheels of a vehicle.

It is to be noted that, since the force for engaging the brake band and drum is derived largely from the rotation of the drum, the braking force is proportional to the movement being retarded. Consequently, there will be no skidding or sliding of the wheels when the brake is applied. Furthermore, the brakes do not require adjustment, and the mechanism may be used constantly without worry or trouble.

I claim:

1. A brake mechanism comprising a rotatable drum, a brake band fixed against rotation and engageable with the drum, means for moving the band into engagement with the drum, a clutch surface on the drum, a clutch member engageable with the clutch surface, and flexible means connecting the clutch member and brake band moving means and operable in either direction of rotation of the drum for engaging the band and drum upon engagement of the clutch.

2. A brake mechanism comprising a rotatable drum, a brake band fixed against rotation and engageable with the drum, means for moving the band into engagement with the drum, a clutch surface on the drum, a clutch member mounted for oscillatory movement and engageable with the clutch surface, means for effecting the engagement of the clutch, and flexible means connecting the clutch member and brake band moving means and operable in either direction of rotation of the drum for engaging the band and drum upon oscillation of the clutch member.

3. A brake mechanism comprising a rotatable drum, a brake band fixed against rotation and engageable with the drum, an actuating couple connected with the brake band, a clutch surface on the drum, a clutch member engageable with the clutch surface, and flexible means connecting the clutch member and couple and operable in either direction of rotation of the drum for engaging the brake band and drum upon engagement of the clutch.

4. A brake mechanism comprising a rotatable drum, a brake band fixed against rotation and engageable with the drum, an actuating couple connected with the brake band, a clutch surface on the drum, a clutch member mounted for oscillatory movement and engageable with the clutch surface, means for effecting the engagement of the clutch, and flexible means connecting the clutch member and couple and operable in either direction of rotation of the drum for engaging the brake band and drum upon oscillation of the clutch member.

5. A brake mechanism comprising a drum, a clutch surface formed within the drum, a clutch member slidably mounted within the drum for engaging the clutch surface, means for moving the clutch member into engagement with the clutch surface, a brake band mounted within the drum and engageable therewith, an actuating couple connected with the brake band, and flexible means connecting the couple and clutch member and operable in either direction of rotation of the drum for rotating the couple to engage the brake band and drum upon engagement of the clutch.

6. A brake mechanism comprising a rotatable drum, a brake band fixed against rotation and engageable with the drum, an actuating couple connected with the brake band, a clutch surface on the drum, a clutch member mounted for oscillatory movement and engageable with the clutch surface, means for effecting the engagement of the clutch, and means connecting the clutch member and couple for rotating the couple in the same direction to engage the brake band and drum upon oscillation of the clutch member in either direction.

7. A braking mechanism for a vehicle having front and rear wheel brakes comprising means for actuating the rear wheel brake, a pulley connected with said actuating means, a second pulley adapted to actuate the front wheel brake, and a flexible link having one end connected to and extending radially of the first pulley and having the other end connected to and disposed about the periphery of the second pulley.

8. A brake mechanism comprising a rotatable drum, a brake band engageable with the drum, means including a circular plate for moving the band into engagement with the drum, a clutch surface on the drum, a clutch member mounted for oscillatory movement and engageable with the clutch surface, and a flexible link having one end connected to and extending radially of the clutch member and having the other end connected to and disposed about the periphery of the circular plate so that rotation of the clutch member in either direction operates to rotate the plate in the same direction.

9. A braking mechanism for a vehicle having front and rear wheel brakes comprising means for actuating the rear wheel brake, and crank means connected with said actuating means and having an effective crank arm extending substantially horizontal in its normal position, a second crank means adapted to actuate the front brake and having an effective crank arm disposed angularly of the first crank arm, and a link connecting said crank means.

In testimony whereof, I have hereunto set my hand.

CHARLES W. COLLINS.